US009588377B2

(12) United States Patent
Lee et al.

(10) Patent No.: US 9,588,377 B2
(45) Date of Patent: Mar. 7, 2017

(54) LIQUID CRYSTAL DISPLAY

(71) Applicant: Samsung Display Co., Ltd., Yongin-si (KR)

(72) Inventors: Se Hyun Lee, Seoul (KR); Ka Eun Kim, Yongin-si (KR); Cheol Shin, Hwaseong-si (KR); Hak Sun Chang, Yongin-si (KR); Ki Chul Shin, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/938,611

(22) Filed: Nov. 11, 2015

(65) Prior Publication Data
US 2016/0291410 A1 Oct. 6, 2016

(30) Foreign Application Priority Data

Apr. 6, 2015 (KR) .................. 10-2015-0048275

(51) Int. Cl.
*G02F 1/1337* (2006.01)
*G02F 1/1343* (2006.01)
*G02F 1/1333* (2006.01)

(52) U.S. Cl.
CPC .... *G02F 1/133707* (2013.01); *G02F 1/13439* (2013.01); *G02F 1/133345* (2013.01); *G02F 1/134309* (2013.01); *G02F 2001/133738* (2013.01)

(58) Field of Classification Search
CPC ......... G02F 1/133707; G02F 1/133345; G02F 1/134309; G02F 1/13439
See application file for complete search history.

(56) References Cited

U.S. PATENT DOCUMENTS

| 7,345,730 | B2 | 3/2008 | Kim et al. | |
|---|---|---|---|---|
| 9,372,374 | B2 * | 6/2016 | Kim | G02F 1/134336 |
| 9,436,045 | B2 * | 9/2016 | Song | G02F 1/134309 |
| 2007/0182872 | A1 | 8/2007 | Hong et al. | |
| 2012/0162559 | A1 * | 6/2012 | Kim | G02F 1/134363 349/42 |
| 2013/0242239 | A1 * | 9/2013 | Chang | G02F 1/133707 349/106 |
| 2014/0168582 | A1 * | 6/2014 | Chang | G02F 1/134309 349/106 |

(Continued)

FOREIGN PATENT DOCUMENTS

| KR | 1020130104224 | 9/2013 |
|---|---|---|
| KR | 1020130104521 | 9/2013 |
| KR | 1020140021749 | 2/2014 |

*Primary Examiner* — James Dudek
(74) *Attorney, Agent, or Firm* — Cantor Colburn LLP

(57) ABSTRACT

A liquid crystal display includes a first substrate, a first pixel electrode disposed on the first substrate, a second pixel electrode overlapping the first pixel electrode, having an insulating layer disposed therebetween, wherein the second pixel electrode includes a plate-like part having an integrated shape, a plurality of branch electrodes extending from the plate-like part, and a cruciform cutout including a horizontal part and a vertical part intersecting each other at a center of the plate-like part, and the first pixel electrode includes a cruciform stem electrode having a horizontal stem and a vertical stem intersecting each other at the center.

17 Claims, 14 Drawing Sheets

(56) References Cited

U.S. PATENT DOCUMENTS

2014/0267994 A1\* 9/2014 Ryu .................... G02F 1/13439
                                                    349/141
2015/0116641 A1\* 4/2015 Oh ..................... G02F 1/133707
                                                    349/106
2015/0205168 A1\* 7/2015 Ryu .................. G02F 1/134309
                                                    349/43

\* cited by examiner

LIQUID CRYSTAL DISPLAY

This application claims priority to Korean Patent Application No. 10-2015-0048275 filed on Apr. 6, 2015, and all the benefits accruing therefrom under 35 U.S.C. §119, the content of which in its entirety is incorporated herein by reference.

BACKGROUND (a) Field

The invention relates to a liquid crystal display.

(b) Description of the Related Art

A liquid crystal display ("LCD") is a flat panel display which has been most widely used currently and generally includes two sheets of display panels in which field generating electrodes, such as a pixel electrode and a common electrode, are formed and a liquid crystal layer interposed therebetween. In the LCD, the field generating electrode is applied with a voltage to generate an electric field in the liquid crystal layer and an orientation of liquid crystal molecules of the liquid crystal layer is determined and polarization of incident light is controlled based on the generated electric field to display an image.

Among the LCDs, an LCD in a vertically aligned mode in which major axes of the liquid crystal molecules are aligned to be vertical to the upper and lower display panels in the state in which an electric field is not applied to the liquid crystal layer has a large contrast ratio and a wide reference viewing angle, and therefore has been received attention.

In order to implement the wide viewing angle in the LCD in the vertically aligned mode, a plurality of domains having different alignment directions of the liquid crystal may be formed in one pixel.

As one example of a technology of forming the plurality of domains, there is a method of forming cutouts, such as a slit, in a field generating electrode, and the like. This method may form the plurality of domains by realigning the liquid crystal by a fringe field formed between an edge of the cutout and the field generating electrode facing the edge.

SUMMARY

In a liquid crystal display ("LCD") including the plurality of domains, to increase transmittance, a portion of a pixel electrode may be provided in a plate-like shape in which the slit, and the like is not provided. However, an influence of the fringe field on the plate-like part of the pixel electrode is reduced and thus an irregular motion of liquid crystal molecules may occur, which leads to a deterioration in display quality. Further, in the case of a curved LCD, a strain may occur due to a misalignment between upper and lower plates.

The invention has been made in an effort to provide an LCD having advantages of preventing display quality from deteriorating while increasing transmittance of the LCD including a plurality of domains.

An exemplary embodiment of the invention provides an LCD including: a first substrate, a first pixel electrode disposed on the first substrate, a second pixel electrode overlapping the first pixel electrode, having an insulating layer disposed therebetween, wherein the second pixel electrode includes a plate-like part having an integrated shape, a plurality of branch electrodes extending from the plate-like part, and a cruciform cutout including a horizontal part and a vertical part intersecting each other at a center of the plate-like part, and the first pixel electrode includes a cruciform stem electrode having a horizontal stem and a vertical stem intersecting each other at the center.

In an exemplary embodiment, the horizontal stem and the vertical stem may have a constant width and the horizontal part and the vertical part may also have a constant width.

In an exemplary embodiment, the plurality of branch electrodes may extend in four different directions.

In an exemplary embodiment, the LCD may further include: a second substrate facing the first substrate, and a common electrode disposed inside the second substrate, wherein the common electrode is provided as an integrated plate.

In an exemplary embodiment, the first pixel electrode may be applied with a voltage 1.23 times as high as that applied to the second pixel electrode.

In an exemplary embodiment, the second pixel electrode may be applied with a voltage of 8 volts (V) and the first pixel electrode may be applied with a voltage of 10 V or more.

In an exemplary embodiment, the first pixel electrode may have a rhombus shape at the center at which the horizontal stem and the vertical stem intersect each other and the cruciform cutout of the second pixel electrode may have the cutout having the rhombus shape at the center at which the horizontal part and the vertical part intersect each other.

In an exemplary embodiment, the horizontal stem and the vertical stem may have a constant width, the horizontal part and the vertical part may also have a constant width, and the plurality of branch electrodes may extend in four different directions.

In an exemplary embodiment, the LCD may further include: a second substrate facing the first substrate, and a common electrode disposed inside the second substrate, wherein the common electrode is provided as an integrated plate.

In an exemplary embodiment, the first pixel electrode may be applied with a voltage about 1.23 times as high as that applied to the second pixel electrode.

In an exemplary embodiment, the second pixel electrode may be applied with a voltage of about 8 volts (V) and the first pixel electrode may be applied with a voltage of about 10 V or more.

In an exemplary embodiment, the plurality of branch electrodes may extend in four different directions and branch electrodes positioned left and right based on the vertical part may be asymmetrical to each other and branch electrodes positioned up and down based on the horizontal part may also be asymmetrical to each other.

In an exemplary embodiment, the first pixel electrode may have the rhombus shape at the center at which the horizontal stem and the vertical stem intersect each other and the cruciform cutout of the second pixel electrode may have the cutout having the rhombus shape at the center at which the horizontal part and the vertical part intersect each other.

In an exemplary embodiment, the horizontal stem and the vertical stem may have a constant width and the horizontal part and the vertical part may also have a constant width.

In an exemplary embodiment, the LCD may further include: a second substrate facing the first substrate, and a common electrode disposed inside the second substrate, wherein the common electrode is provided as an integrated plate.

In an exemplary embodiment, the first pixel electrode may be applied with a voltage 1.23 times as high as that applied to the second pixel electrode.

In an exemplary embodiment, the second pixel electrode may be applied with a voltage of about 8 V and the first pixel electrode may be applied with a voltage of about 10 V or more.

In accordance with the LCD according to an exemplary embodiment of the invention, it is possible to prevent the display quality from deteriorating while increasing the transmittance of the LCD including the plurality of domains.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
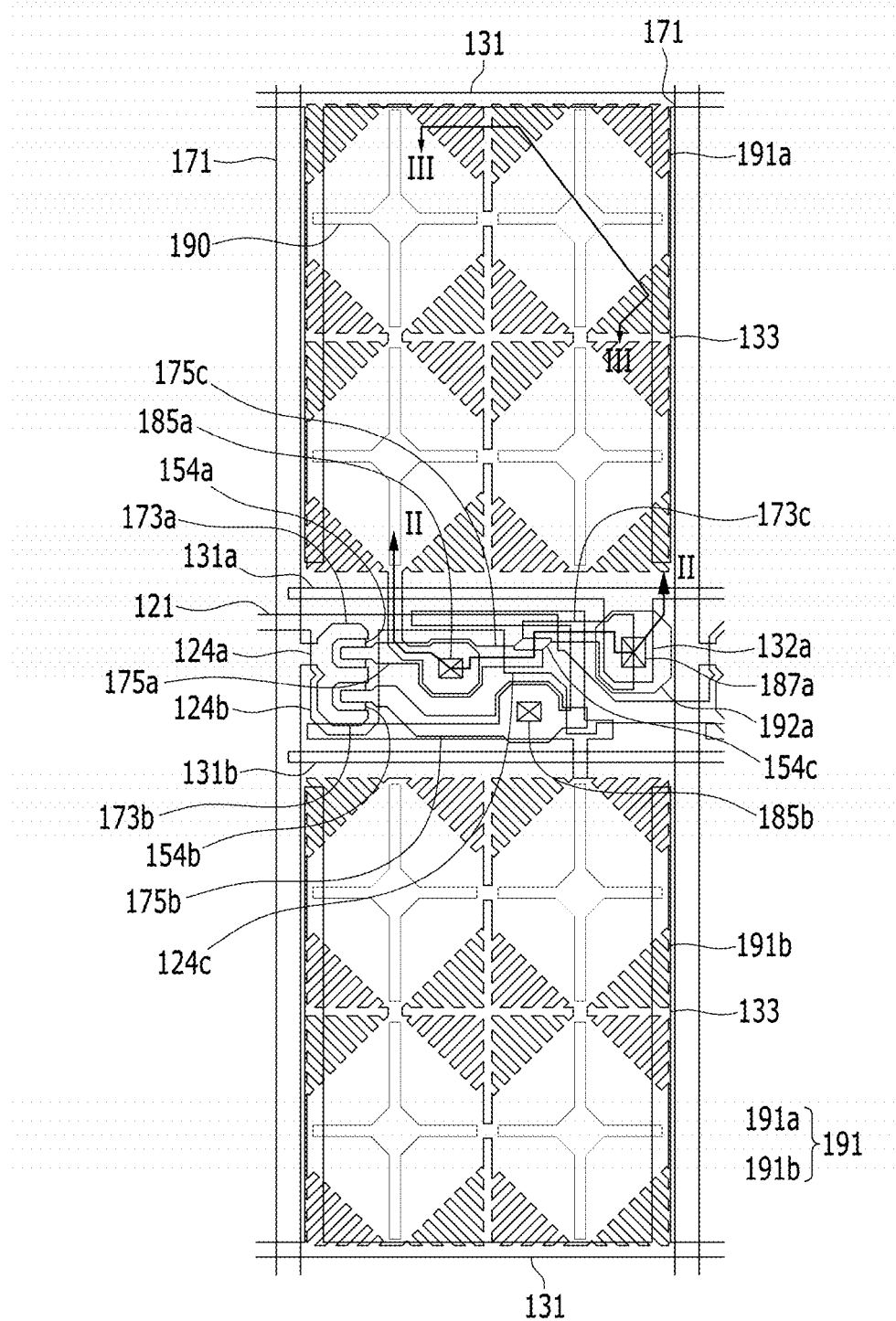
FIG. 1 is a plan view of one pixel area of a liquid crystal display ("LCD") according to an exemplary embodiment of the invention.

In the following detailed description, several exemplary embodiments of the invention have been shown and described, simply by way of illustration. As those skilled in the art would realize, the described embodiments may be modified in various different ways, all without departing from the spirit or scope of the invention.

Accordingly, the drawings and description are to be regarded as illustrative in nature and not restrictive. Like reference numerals designate like elements throughout the specification.

Further, in exemplary embodiments, a first exemplary embodiment is representatively described, and in other exemplary embodiments, only a configuration different from the first exemplary embodiment will be described.

In addition, the size and thickness of each configuration shown in the drawings such as exaggerating the thickness of layers, regions, etc., for clarity are arbitrarily shown for understanding and ease of description, but the invention is not limited thereto.

It will be understood that when an element such as a layer, film, region, or substrate is referred to as being "on" and "under" another element, it can be directly on the other element or a third layer may also be interposed therebetween.

In addition, unless explicitly described to the contrary, the word "comprise" and variations such as "comprises" or "comprising", will be understood to imply the inclusion of stated elements but not the exclusion of any other elements.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
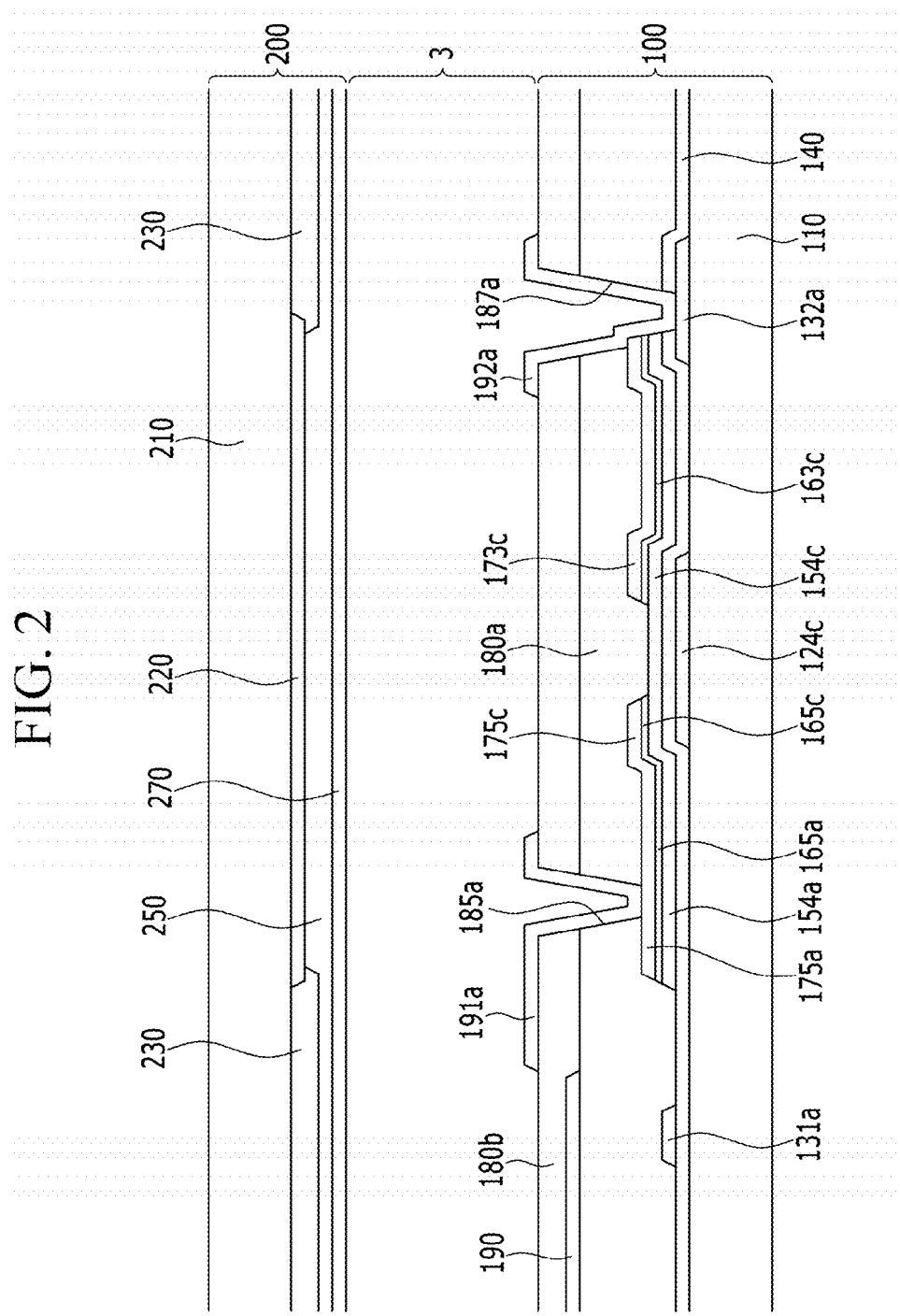
FIG. 2 is a cross-sectional view of the LCD of FIG. 1 taken along line II-II.
Figure 3:
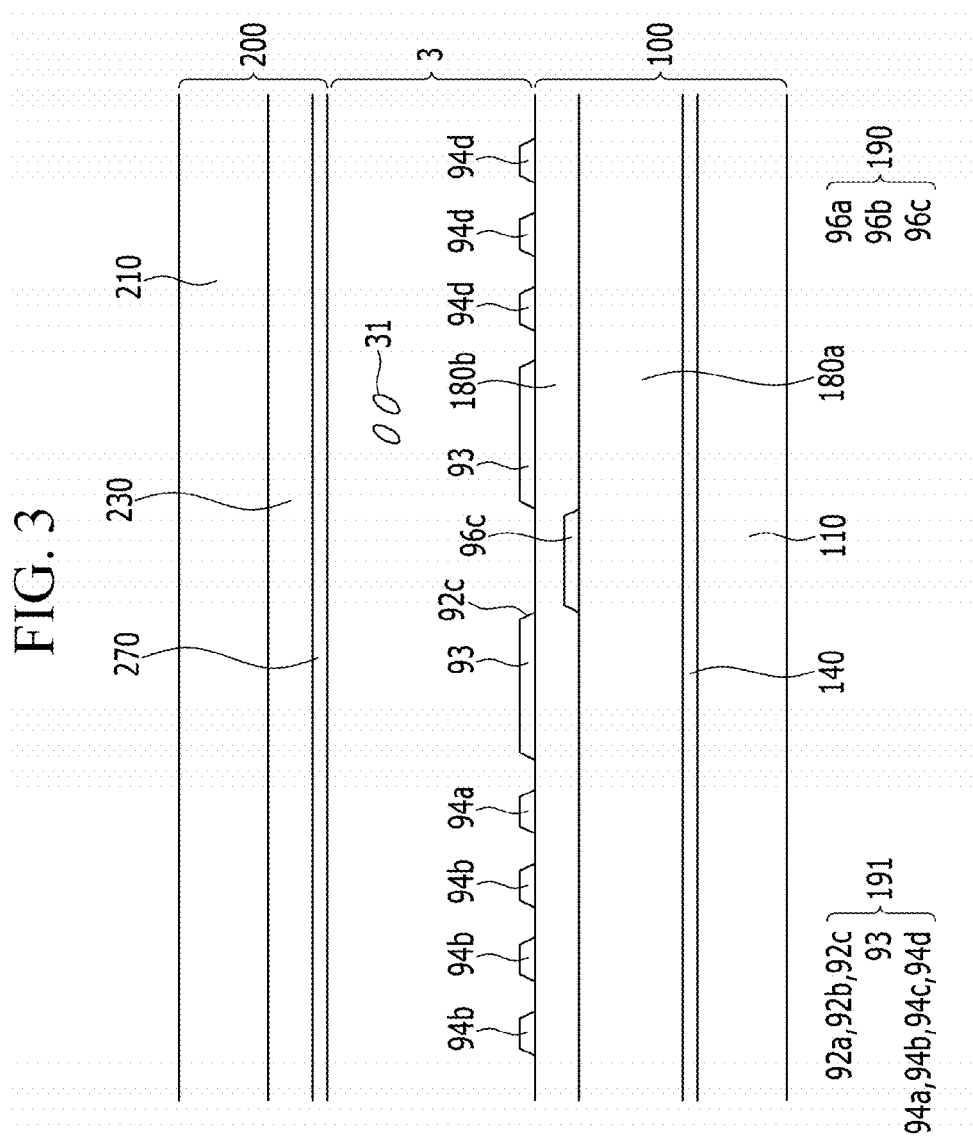
FIG. 3 is a cross-sectional view of the LCD of FIG. 1 taken along line III-III.
Figure 4:
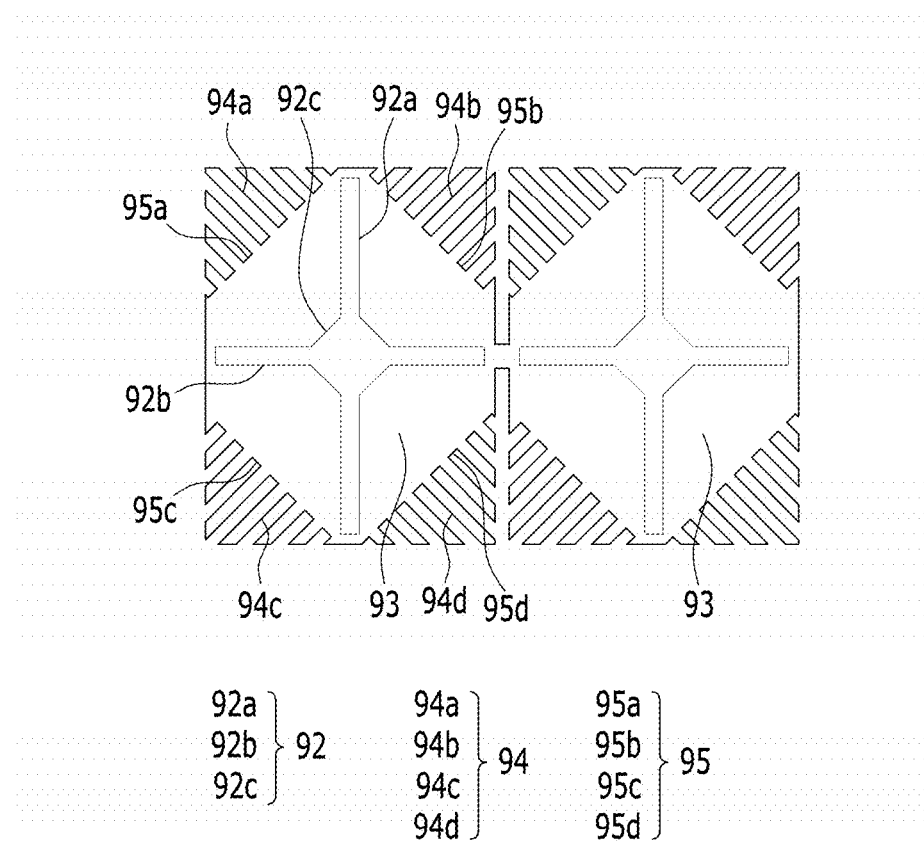
FIG. 4 is an enlarged view of a portion of a second pixel electrode 191 in the LCD of FIG. 1.
Figure 5:
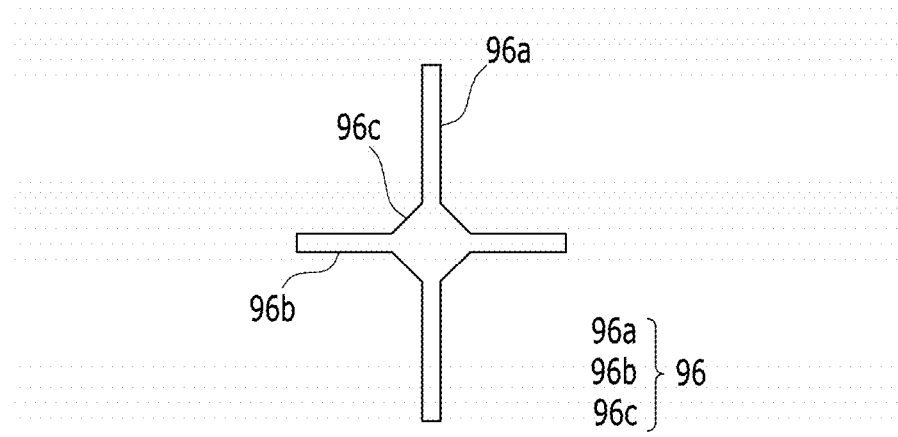
FIG. 5 is an enlarged view of a portion of a first pixel electrode 190 in the LCD of FIG. 1.

First, a liquid crystal display ("LCD") according to the exemplary embodiment of the invention will be described in detail with reference to FIGS. 1 to 5. FIG. 1 is a plan view of one pixel area of an LCD according to an exemplary embodiment of the invention and FIG. 2 is a cross-sectional view of the LCD of FIG. 1 taken along line II-II. FIG. 3 is a cross-sectional view of the LCD of FIG. 1 taken along line III-III, FIG. 4 is an enlarged view of a portion of a second pixel electrode 191 in the LCD of FIG. 1, and FIG. 5 is an enlarged view of a portion of a first pixel electrode 190 in the LCD of FIG. 1.

The LCD according to the exemplary embodiment of the invention includes the lower display panel 100 and the upper display panel 200 facing each other and the liquid crystal layer 3 injected between the two display panels 100 and 200.

First, the lower display panel 100 will be described.

A gate conductor which includes a gate line 121, a sustain electrode line 131, a first voltage transfer line 131a, and a second voltage transfer line 131b is disposed on a first substrate 110.

The gate line 121 mainly extends in a horizontal direction to transfer a gate signal. Further, a first gate electrode 124a and a second gate electrode 124b which protrude from the gate line 121 are disposed on the gate line 121. Further, a third gate electrode 124c is provided to be spaced apart from the first gate electrode 124a and the second gate electrode 124b while protruding from the gate line 121. The first to third gate electrodes 124a, 124b, and 124c are connected to the same gate line 121 and are applied with the gate signal.

The sustain electrode line 131 extends in the same direction as the gate line 121 and is applied with a constant voltage. Further, a sustain electrode 133 protruding from the sustain electrode line 131 is provided. The sustain electrode 133 may be provided to enclose a first subpixel electrode 191a and a second subpixel electrode 191b to be described below.

The first voltage transfer line 131a and the second voltage transfer line 13 lb also extend in the same direction as the gate line 121 and are disposed in parallel with the sustain electrode line 131. The first voltage transfer line 131a has a first voltage transfer electrode 132a which is a protruding portion.

A gate insulating layer 140 is disposed on the gate conductor. In an exemplary embodiment, the gate insulating layer 140 may include inorganic insulating materials such as silicon nitride (SiNx) and silicon oxide (SiOx). Further, the gate insulating layer 140 may include a single layer or a multilayer. The gate insulating layer 140 is provided with a third contact hole 187a through which a portion of the first voltage transfer electrode 132a is exposed.

A first semiconductor layer 154a, a second semiconductor layer 154b, and a third semiconductor layer 154c are disposed on the gate insulating layer 140. The first semiconductor layer 154a may be positioned on the first gate electrode 124a, the second semiconductor layer 154b may be positioned on the second gate electrode 124b, and the third semiconductor layer 154c may be positioned on the third gate electrode 124c.

A data line 171, a first source electrode 173a, a first drain electrode 175a, a second source electrode 173b, a second drain electrode 175b, a third source electrode 173c, and a third drain electrode 175c are disposed on the first to third semiconductor layers 154a, 154b, and 154c and the gate insulating layer 140.

The first to third semiconductor layers 154a, 154b, and 154c may be disposed on the first to third gate electrodes 124a, 124b, and 124c and may also be disposed under the data line 171.

A plurality of ohmic contacts 163c, 165a and 165c may be disposed on the semiconductor layer.

The data lines 171 transfer the data signals and mainly extend in a vertical direction to intersect the gate lines 121.

The first source electrode 173a is provided to protrude up the first gate electrode 124a from the data line 171. The first source electrode 173a may be bent in a C-letter shape over the first gate electrode 124a.

The first drain electrode 175a is provided to be spaced apart from the first source electrode 173a over the first gate electrode 124a. A channel is disposed in the first semiconductor layer 154a of the portion exposed between the first source electrode 173a and the first drain electrode 175a which are provided to be spaced apart from each other. The first drain electrode 175a and the third drain electrode 175c are connected to each other.

The second source electrode 173b is provided to protrude up the second gate electrode 124b from the data line 171. The second source electrode 173b may be bent in a C-letter shape over the second gate electrode 124b.

The second drain electrode 175b is provided to be spaced apart from the second source electrode 173b over the second gate electrode 124b. A channel is disposed in the second semiconductor layer 154b of the portion exposed between the second source electrode 173b and the second drain electrode 175b which are provided to be spaced apart from each other.

The third drain electrode 175c is connected to the first drain electrode 175a, and is disposed on the third gate electrode 124c.

The third source electrode 173c is provided to be spaced apart from the third drain electrode 175c over the third gate electrode 124c. A channel is disposed in the third semiconductor layer 154c of the portion exposed between the third source electrode 173c and the third drain electrode 175c which are provided to be spaced apart from each other.

The first gate electrode 124a, the first semiconductor layer 154a, the first source electrode 173a, and the first drain electrode 175a which are described above provide a first switching element. Further, the second gate electrode 124b, the second semiconductor layer 154b, the second source electrode 173b, and the second drain electrode 175b provide a second switching element and the third gate electrode 124c, the third semiconductor layer 154c, the third source electrode 173c, and the third drain electrode 175c provide a third switching element.

A passivation layer 180a is disposed on the data line 171, the first to third source electrodes 173a, 173b, and 173c, and the first to third drain electrodes 175a, 175b, and 175c. The passivation layer 180a may include an organic insulating material or an inorganic insulating material and may include a single layer or a multilayer. The passivation layer 180a includes an organic insulating material and thus may be provided as flat.

A first contact hole 185a is defined on the passivation layer 180a to expose a portion of the first drain electrode 175a, a second contact hole 185b is disposed thereon to expose a portion of the second drain electrode 175b, and a third contact hole 187a is disposed thereon to expose a portion of the first voltage transfer electrode 132a and the third source electrode 173c.

The first pixel electrode 190 is disposed on the passivation layer 180a. The first pixel electrode 190 includes a plurality of cruciform stem electrodes 96, in which the cruciform stem electrode 96 includes a vertical stem 96a and a horizontal stem 96b which intersect each other at a center of a plate-like part 93 of the second pixel electrode 191 to be described below. The vertical stem 96a and the horizontal stem 96b have a constant width and have the same width. Further, a center at which the vertical stem 96a and the horizontal stem 96b intersect each other has a rhombus shape 96c.

An insulating layer 180b is disposed on the first pixel electrode 190. In an exemplary embodiment, the insulating layer 180b may include an organic insulating material or an inorganic insulating material and may include a single layer or a multilayer. In an exemplary embodiment, the insulating layer 180b includes an organic insulating material and thus may be provided as flat.

A connecting member 192a and the second pixel electrode 191 are disposed on the insulating layer 180b. The second pixel electrode 191 includes a first subpixel electrode 191a and a second subpixel electrode 191b.

The first subpixel electrode 191a is physically and electrically connected to the first drain electrode 175a through the first contact hole 185a and the second subpixel electrode 191b is physically and electrically connected to the second drain electrode 175b through the second contact hole 185b.

The first subpixel electrode 191a and the second subpixel electrode 191b are separated from each other, have the gate line 121 disposed therebetween, are positioned over and under the pixel area with reference to the gate line 121 and are adjacent to each other in a column direction. The first subpixel electrode 191a and the second subpixel electrode 191b include the plate-like part 93 having the rhombus shape, a plurality of branch electrodes 94 extending in four different directions from the plate-like part 93, and a cruciform cutout 92 defined at the plate-like part 93.

The plurality of branch electrodes 94 include a first direction branch electrode 94a obliquely extending up left, a second direction branch electrode 94b obliquely extending up right, a third direction branch electrode 94c obliquely extending down left, and a fourth direction branch electrode 94d extending down right.

A first direction groove part 95 which caves long is defined between the first direction branch electrodes 94a, a second direction groove part 95b is defined between the second direction branch electrodes 94b, a third direction groove part 95c is defined between the third direction branch electrodes 94c, and a fourth direction groove part 95d is defined between the fourth direction branch electrodes 94d.

In the plurality of branch electrodes 94, branch electrodes which are positioned left and right based on a vertical part 92a are asymmetrically provided to each other and branch electrodes which are positioned up and down based on the horizontal part 92b are also asymmetrically provided to each other. That is, among the plurality of branch electrodes 94, the first direction branch electrode 94a and the second direction branch electrode 94b which is positioned right based on the vertical part 92a are asymmetrical to each other and the first direction branch electrode 94a and the third direction branch electrode 94c which is positioned at a lower portion based on the horizontal part 92b are also asymmetrical to each other. As a result, the second direction branch electrode 94b and the third direction branch electrode 94c may be symmetrical to each other and the first direction branch electrode 94a and the fourth direction branch electrode 94d may be symmetrical to each other, having the cruciform cutout 92 defined in the middle thereof.

When the branch electrodes 94 which extend in different directions are asymmetrical, the positions of the branch electrodes 94 and the groove part 95 which caves long between the branch electrodes 94 may be the opposite to each other. That is, among the plurality of branch electrodes 94, describing the first direction branch electrode 94a and the second direction branch electrode 94b as an example, a position symmetrical to the first direction branch electrode 94a based on the vertical part 92a is provided with a second direction groove part 95b, not the second direction branch electrode and a position symmetrical to a first direction groove part 95a based on the vertical part 92a is provided with the second direction branch electrode 94b, not the second direction groove part 95b.

The cruciform cutout 92 has the vertical part 92a and the horizontal part 92b which intersect each other at the center of the plate-like part 93. The vertical part 92a and the horizontal part 92b have a constant width and have the same width. Further, the cruciform cutout 92 is defined in a rhombus shape 92c at the center at which the vertical part 92a and the horizontal part 92b intersect each other. The cruciform cutout 92 is defined corresponding to the position of the cruciform stem electrode 96 of the first pixel electrode 190.

The first subpixel electrode 191a and the second subpixel electrode 191b are divided into a plurality of sub-regions by the plurality of branch electrodes 94 which extend in four different directions.

The connecting member 192a is disposed on the third contact hole 187a to connect between the first voltage transfer line 131a and the third source electrode 173c.

Hereinafter, the upper display panel 200 will be described.

A light blocking member 220 is positioned on a second substrate 210. The light blocking member 220 is referred to as a black matrix and prevents light leakage. The light blocking member 220 may be disposed at positions corresponding to the first to third switching elements and the first to third contact holes 185a, 185b, and 187a and may also be disposed at the position corresponding to the data line 171.

A plurality of color filters 230 are positioned on the second substrate 210 and the light blocking member 220. The color filter 230 may extend long corresponding to a column of the second pixel electrodes 191. In an exemplary embodiment, each color filter 230 may display one of primary colors such as three primary colors of red, green, and blue, for example. However, the invention is not limited thereto, and the color filter may also display one of cyan, magenta, yellow, white-based colors, without being limited to the three primary colors of red, green, and blue, for example.

An overcoat 250 is disposed on the color filter 230. The overcoat 250 may include an organic insulating material or an inorganic insulating material and may include a single layer or a multilayer. The overcoat 250 includes an organic insulating material and thus may be provided as flat. The overcoat 250 prevents the color filter 230 and the light blocking member 220 from lifting and suppresses the liquid crystal layer 3 from polluting due to an organic material, such as a solvent inflowing from the color filter 230, thereby preventing defects, such as an afterimage which may occur at the time of driving the screen, from occurring and omitting the defects.

In the LCD according to the exemplary embodiment of the invention which is illustrated, the light blocking member 220 and the color filter 230 are positioned on the upper display panel 200, but the light blocking member 220 and the color filter 230 of the LCD according to another exemplary embodiment of the invention may be positioned on the lower display panel 100. In this case, instead of the passivation layer 180a of the lower display panel 100, the color filter 230 may be positioned.

A common electrode 270 is disposed on the overcoat 250. The common electrode 270 may be provided as integrated plate without a cut portion.

In an exemplary embodiment, the liquid crystal layer 3 which is positioned between the two display panels 100 and 200 includes a plurality of liquid crystal molecules 31 having negative dielectric anisotropy, for example. The liquid crystal molecule is aligned so that a major axis thereof is substantially vertical to the surfaces of the two display panels 100 and 200 in the state in which an electric field is not generated in the liquid crystal layer 3.

By a voltage applied to the first subpixel electrode 191a and the second subpixel electrode 191b and a common voltage applied to the common electrode 270, the electric field is applied to the liquid crystal layer 3 and the alignment of the liquid crystal molecules of the liquid crystal layer 3 is determined depending on the intensity of the electric field. As such, the luminance of light passing through the liquid crystal layer 3 along the alignment of the liquid crystal molecules is changed.

Figure 6:
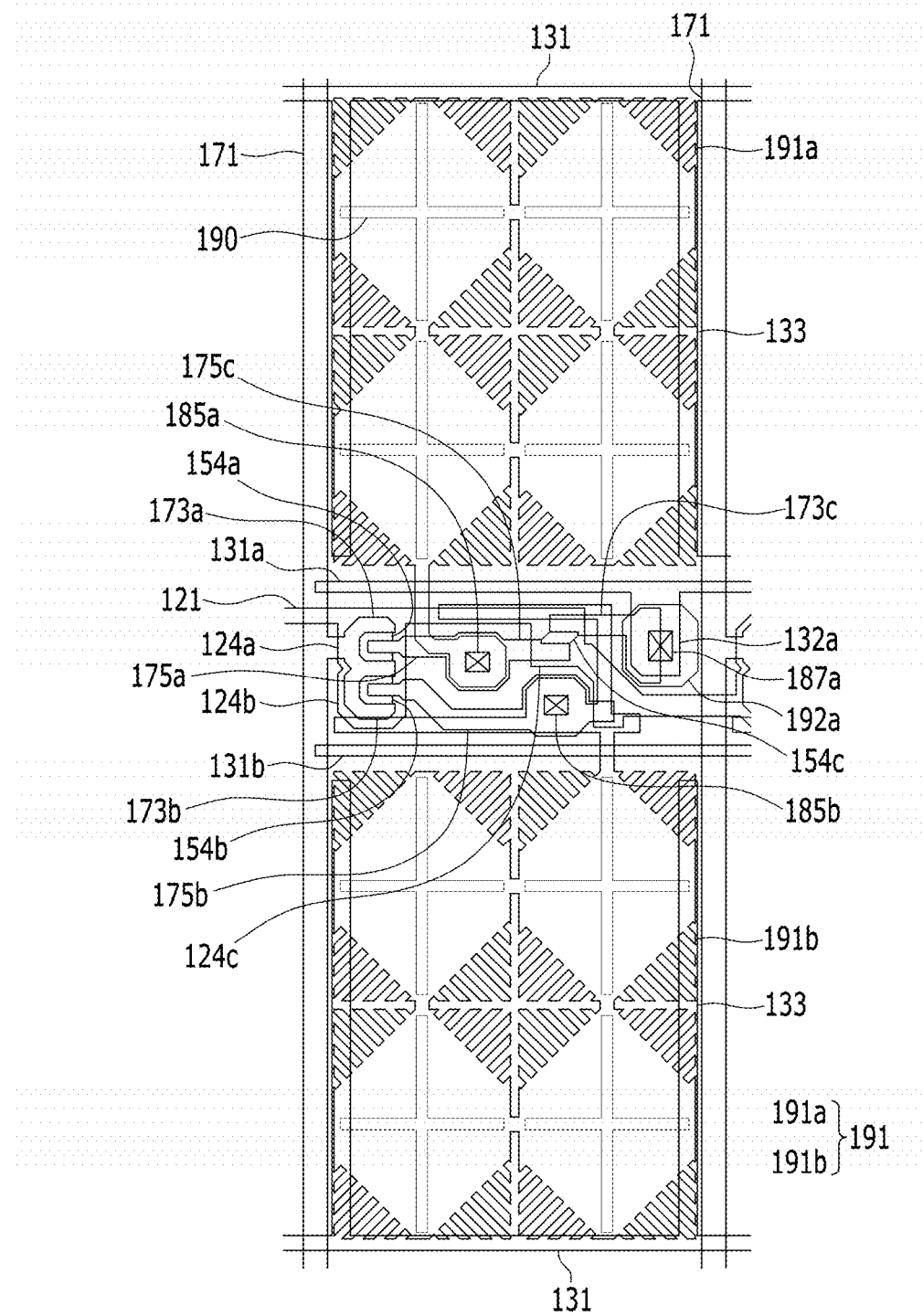
FIG. 6 is a plan view of one pixel area of an LCD according to another exemplary embodiment of the invention.

Hereinafter, an LCD according to another exemplary embodiment of the invention will be described in detail with reference to FIGS. 6 to 8. FIG. 6 is a plan view of one pixel area of an LCD according to another exemplary embodiment of the invention, FIG. 7 is an enlarged view of a portion of a second pixel electrode 191 in the LCD of FIG. 6, and FIG. 8 is an enlarged view of a portion of a first pixel electrode 190 in the LCD of FIG. 6.

Figure 7:
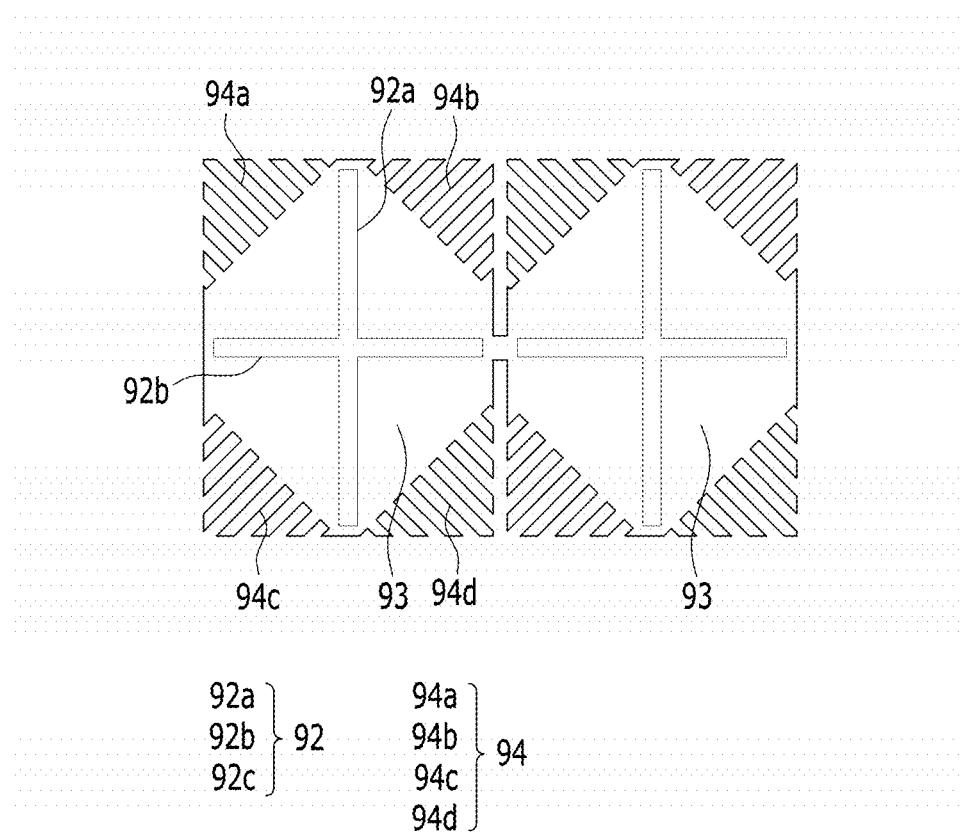
FIG. 7 is an enlarged view of a portion of a second pixel electrode 191 in the LCD of FIG. 6.
Figure 8:
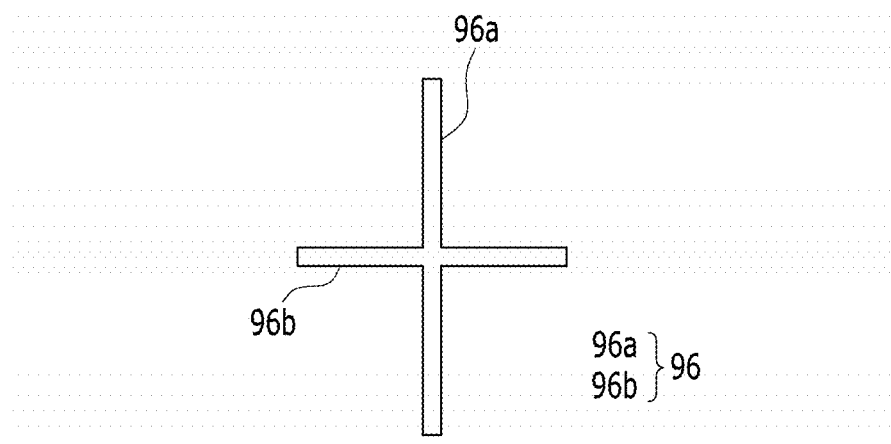
FIG. 8 is an enlarged view of a portion of a first pixel electrode 190 in the LCD of FIG. 6.

Referring to FIGS. 6 to 8, the LCD according to the exemplary embodiment of the invention is similar to the LCD according to the exemplary embodiment of the invention already described with reference to FIGS. 1 to 5. The detailed description of the same constituent elements will be omitted.

Unlike the LCD according to the exemplary embodiment of the invention described with reference to FIGS. 1 to 5, according to the LCD according to the exemplary embodiment of the invention, a center at which a vertical stem 96a and a horizontal stem 96b intersect each other in the first pixel electrode 190 positioned on the passivation layer 180a is not provided as a rhombus shape 96c. Only the vertical stem 96a and the horizontal stem 96b which have the same width and a constant width are provided to intersect each other at the center.

Further, similarly, like the cruciform cutout 92 of the second pixel electrode 191 positioned on the insulating layer 180b is not defined as the rhombus shape 92c at the center at which the vertical part 92a and the horizontal part 92b intersect each other. Only the vertical part 92a and the horizontal part 92b which have the same width and a constant width are provided to intersect each other at the center of the plate-like part 93.

Figure 9:
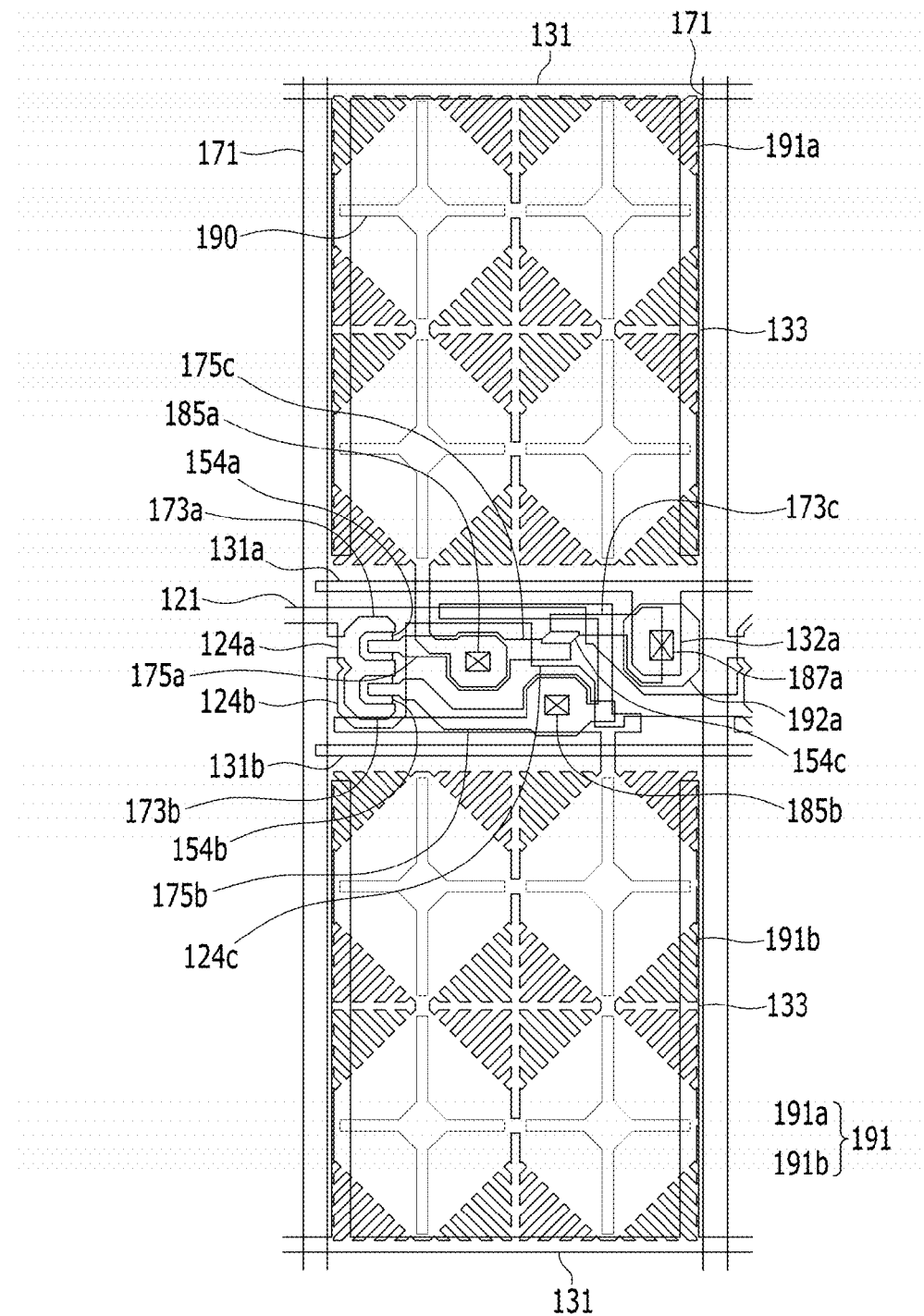
FIG. 9 is a plan view of one pixel area of an LCD according to another exemplary embodiment of the invention.

Next, an LCD according to another exemplary embodiment of the invention will be described in detail with reference to FIGS. 9 and 10. FIG. 9 is a plan view of one pixel area of an LCD according to another exemplary embodiment of the invention and FIG. 10 is an enlarged view of a portion of the second pixel electrode 191 in the LCD of FIG. 9.

Figure 10:
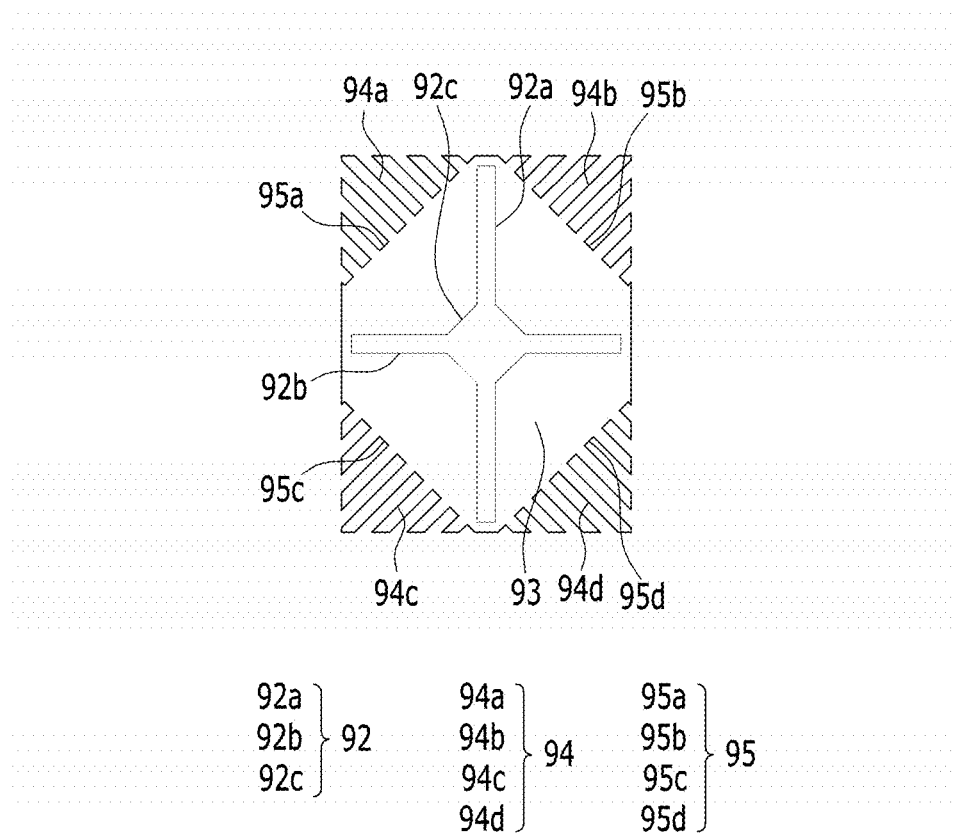
FIG. 10 is an enlarged view of a portion of a second pixel electrode 191 in the LCD of FIG. 9.

Referring to FIGS. 9 and 10, the LCD according to the exemplary embodiment of the invention is similar to the LCD according to the exemplary embodiment of the invention already described with reference to FIGS. 1 to 5. The detailed description of the same constituent elements will be omitted.

Unlike the LCD according to the exemplary embodiment of the invention described with reference to FIGS. 1 to 5, in the LCD according to the exemplary embodiment of the invention, all of the plurality of branch electrodes 94 of the second pixel electrode 191 are provided to be symmetrical to each other. That is, the first direction branch electrode 94a, the second direction branch electrode 94b, the third direction branch electrode 94c, and the fourth direction branch electrode 94d have different extending directions but the position at which the branch electrode 94 is disposed and the position at which the groove part 95 is disposed are symmetrical to each other.

Figure 11:
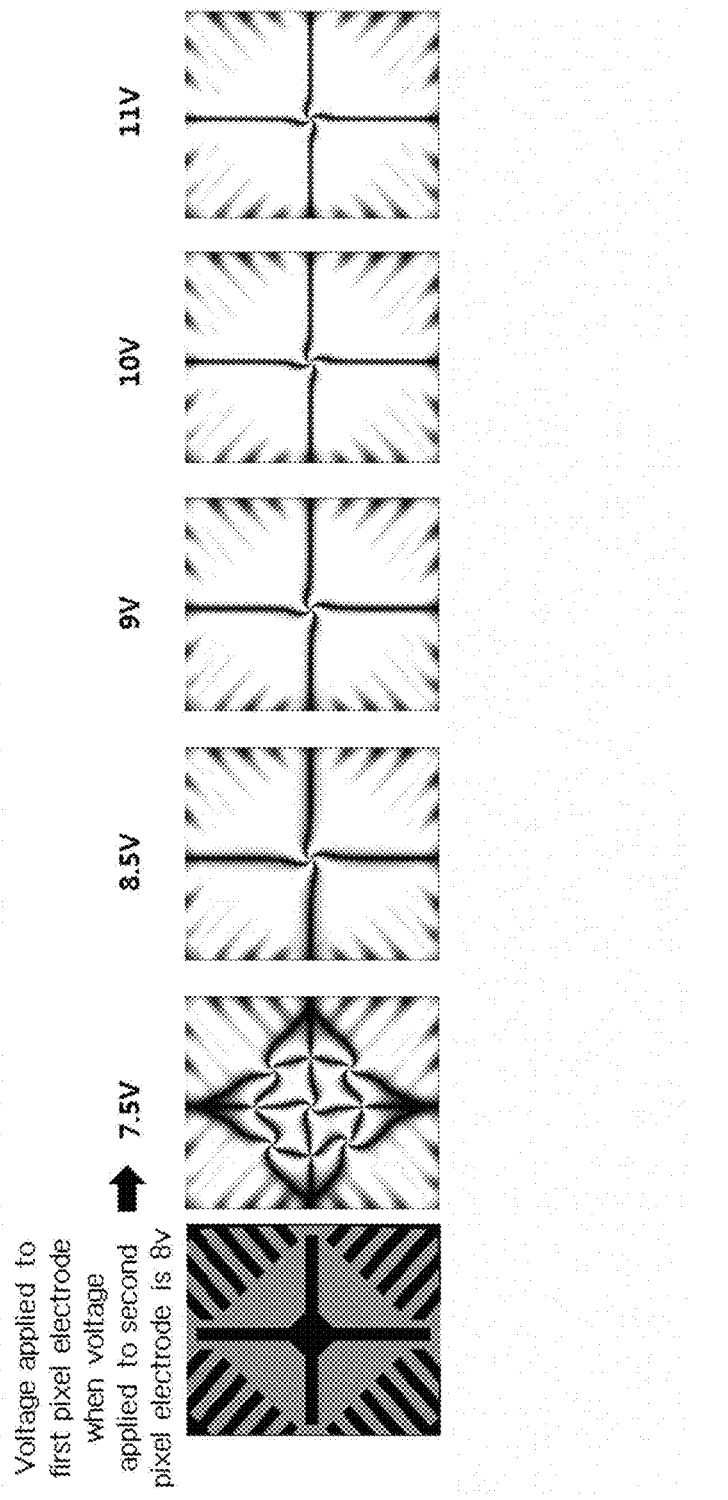
FIG. 11 is a diagram illustrating results of Experimental Example on the LCD illustrated in FIG. 9.

Hereinafter, an effect of the LCD illustrated in FIG. 9 will be described with reference to FIG. 11. FIG. 11 is a diagram illustrating results of Experimental Example on the LCD illustrated in FIG. 9.

FIG. 11 illustrates experimental results on transmittance of the LCD depending on the voltage applied to the first pixel electrode 190 when the voltage applied to the second pixel electrode 191 is 8V in the LCD illustrated in FIG. 9. The higher the voltage applied to the first pixel electrode 190, the larger the transmittance and when the voltage applied to the first pixel electrode 190 is about 10 V or more and thus the voltage applied to the first pixel electrode 190 is about 1.23 times as large as the voltage applied to the second pixel electrode 191, the occurrence of white afterimage is removed.

Figure 12:
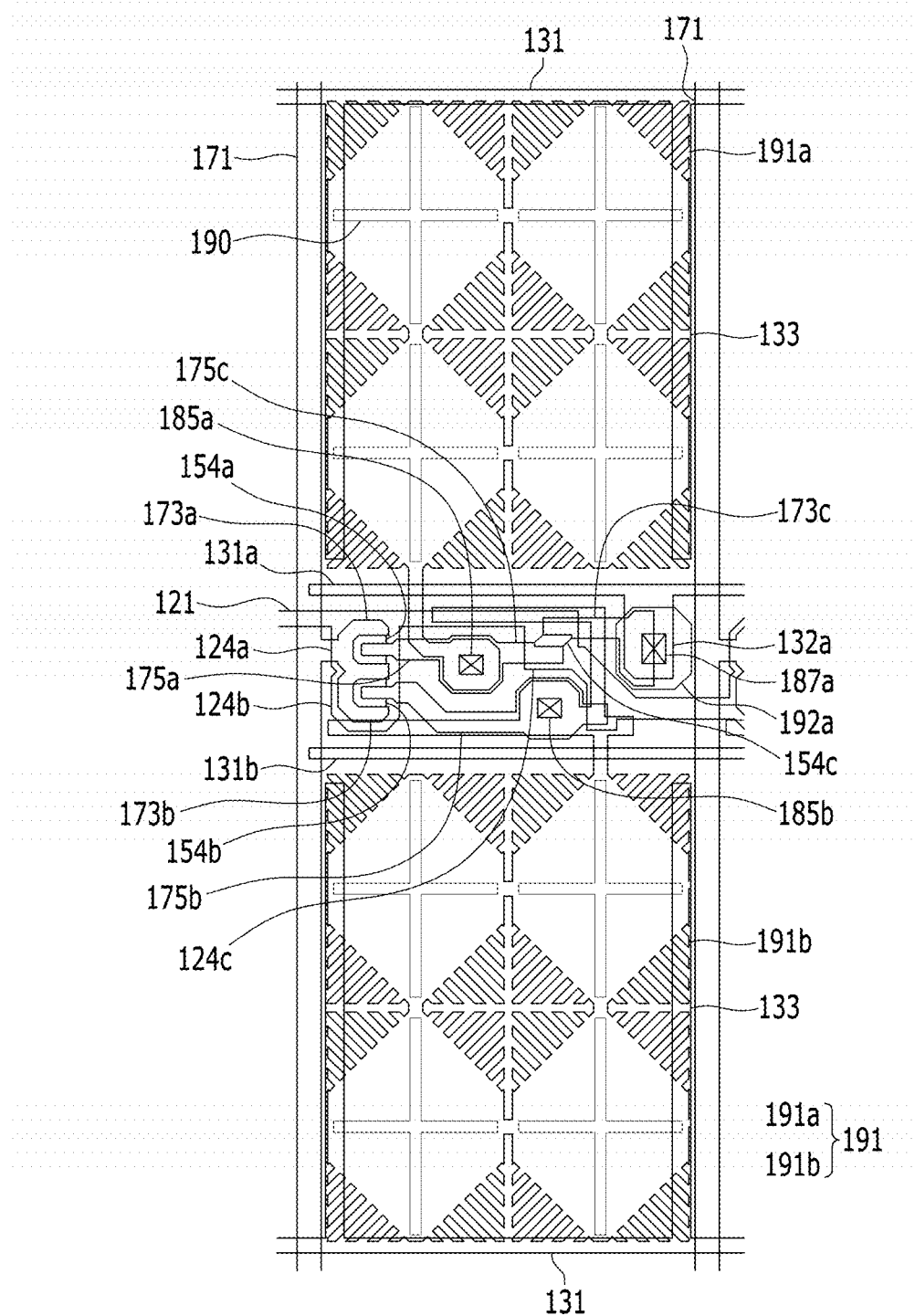
FIG. 12 is a plan view of one pixel area of an LCD according to another exemplary embodiment of the invention.

Next, an LCD according to another exemplary embodiment of the invention will be described in detail with reference to FIGS. 12 and 13. FIG. 12 is a plan view of one pixel area of an LCD according to another exemplary embodiment of the invention and FIG. 13 is an enlarged view of a portion of the second pixel electrode 191 in the LCD of FIG. 12.

Figure 13:
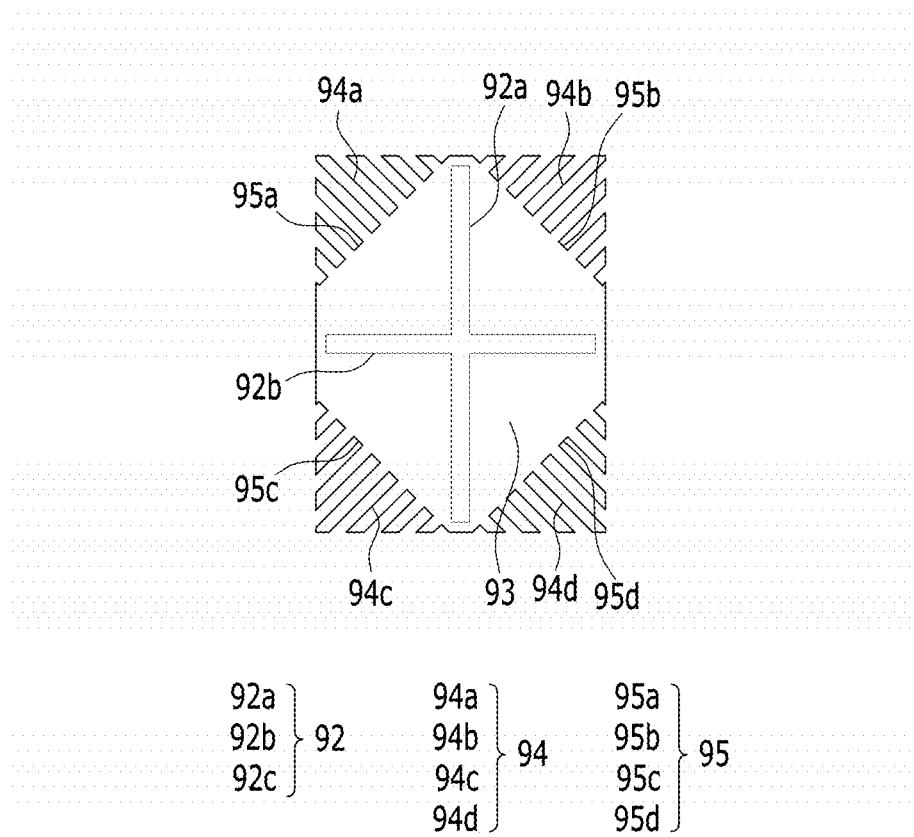
FIG. 13 is an enlarged view of a portion of a second pixel electrode 191 in the LCD of FIG. 12.

Referring to FIGS. 12 and 13, the LCD according to the exemplary embodiment of the invention is similar to the LCD according to the exemplary embodiment of the invention already described with reference to FIGS. 6 to 8. The detailed description of the same constituent elements will be omitted.

Unlike the LCD according to the exemplary embodiment of the invention described with reference to FIGS. 6 to 8, in the LCD according to the exemplary embodiment of the invention, all of the plurality of branch electrodes 94 of the second pixel electrode 191 are provided to be symmetrical to each other. That is, the first direction branch electrode 94a, the second direction branch electrode 94b, the third direction branch electrode 94c, and the fourth direction branch electrode 94d have different extending directions but the position at which the branch electrode 94 is provided and the position at which the groove part 95 is provided are symmetrical to each other.

Figure 14:
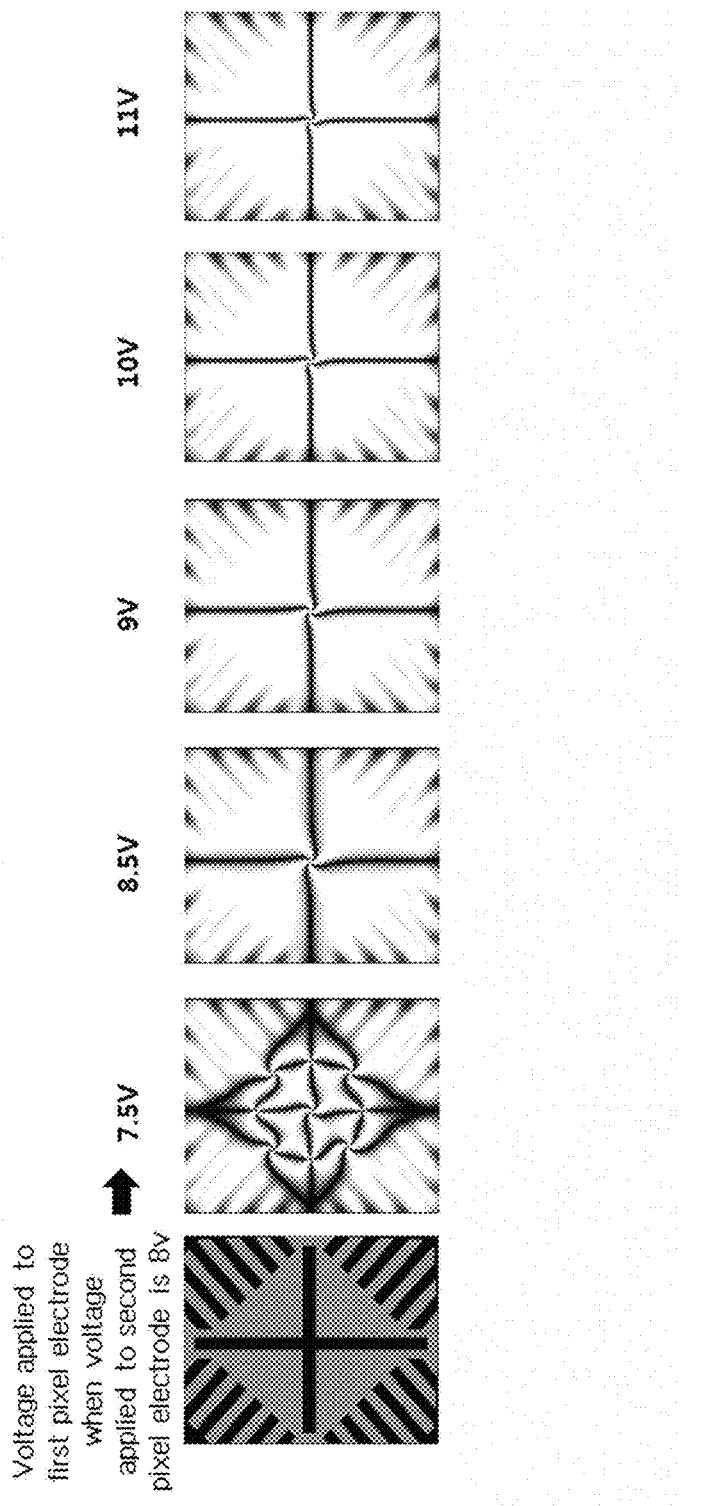
FIG. 14 is a diagram illustrating results of Experimental Example on the LCD illustrated in FIG. 12.

Hereinafter, an effect of the LCD illustrated in FIG. 12 will be described with reference to FIG. 14. FIG. 14 is a diagram illustrating results of Experimental Example on the LCD illustrated in FIG. 12.

FIG. 14 illustrates experimental results on the transmittance of the LCD depending on the voltage applied to the first pixel electrode 190 when the voltage applied to the second pixel electrode 191 is 8 V in the LCD illustrated in FIG. 12. The higher the voltage applied to the first pixel electrode 190, the larger the transmittance and when the voltage applied to the first pixel electrode 190 is about 10 V or more and thus the voltage applied to the first pixel electrode 190 is about 1.23 times as large as the voltage applied to the second pixel electrode 191, the occurrence of white afterimage is removed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first substrate;
a first pixel electrode disposed on the first substrate;
a second pixel electrode overlapping the first pixel electrode, having an insulating layer disposed therebetween,
wherein the second pixel electrode includes a plate-like part having an integrated shape, a plurality of branch electrodes extending from the plate-like part, and a cruciform cutout including a horizontal part and a vertical part intersecting each other at a center of the plate-like part, and
the first pixel electrode includes a cruciform stem electrode having a horizontal stem and a vertical stem intersecting each other at the center.

2. The liquid crystal display of claim 1, wherein:
the horizontal stem and the vertical stem have a constant width, and
the horizontal part and the vertical part also have a constant width.

3. The liquid crystal display of claim 2, wherein:
the plurality of branch electrodes extend in four different directions.

4. The liquid crystal display of claim 3, further comprising:
a second substrate facing the first substrate; and
a common electrode disposed inside the second substrate, wherein the common electrode is provided as an integrated plate.

5. The liquid crystal display of claim 4, wherein:
the first pixel electrode is applied with a voltage about 1.23 times as high as that applied to the second pixel electrode.

6. The liquid crystal display of claim 5, wherein:
the second pixel electrode is applied with a voltage of about 8 volts and the first pixel electrode is applied with a voltage of about 10 volts or more.

7. The liquid crystal display of claim 1, wherein:
the first pixel electrode has a rhombus shape at the center at which the horizontal stem and the vertical stem intersect each other, and
the cruciform cutout of the second pixel electrode has a cutout having a rhombus shape at the center at which the horizontal part and the vertical part intersect each other.

8. The liquid crystal display of claim 7, wherein:
the horizontal stem and the vertical stem have a constant width,
the horizontal part and the vertical part also have a constant width, and
the plurality of branch electrodes extend in four different directions.

9. The liquid crystal display of claim 8, further comprising:
a second substrate facing the first substrate; and
a common electrode disposed inside the second substrate, wherein the common electrode is provided as an integrated plate.

10. The liquid crystal display of claim 9, wherein:
the first pixel electrode is applied with a voltage 1.23 times as high as that applied to the second pixel electrode.

11. The liquid crystal display of claim 10, wherein:
the second pixel electrode is applied with a voltage of about 8 volts and the first pixel electrode is applied with a voltage of about 10 volts or more.

12. The liquid crystal display of claim 1, wherein:
the plurality of branch electrodes extend in four different directions, and
branch electrodes positioned left and right based on the vertical part are asymmetrical to each other and branch electrodes positioned up and down based on the horizontal part are also asymmetrical to each other.

13. The liquid crystal display of claim 12, wherein:
the first pixel electrode has a rhombus shape at the center at which the horizontal stem and the vertical stem intersect each other, and
the cruciform cutout of the second pixel electrode has a cutout having a rhombus shape at the center at which the horizontal part and the vertical part intersect each other.

14. The liquid crystal display of claim 13, wherein:
the horizontal stem and the vertical stem have a constant width, and
the horizontal part and the vertical part also have a constant width.

15. The liquid crystal display of claim 14, further comprising:
a second substrate facing the first substrate; and
a common electrode disposed inside the second substrate, wherein the common electrode is provided as an integrated plate.

16. The liquid crystal display of claim 15, wherein:
the first pixel electrode is applied with a voltage about 1.23 times as high as that applied to the second pixel electrode.

17. The liquid crystal display of claim 16, wherein:
the second pixel electrode is applied with a voltage of about 8 volts and the first pixel electrode is applied with a voltage of about 10 volts or more.

* * * * *